United States Patent [19]
Ota

[11] Patent Number: 5,715,062
[45] Date of Patent: Feb. 3, 1998

[54] METHOD OF MEASURING SIZES OF MOLD AND MOLD-ASSOCIATED COMPONENTS BY LASER MEASURING INSTRUMENT

[75] Inventor: Kazuhiro Ota, Toyokawa, Japan

[73] Assignee: Sintokogio, Ltd., Japan

[21] Appl. No.: 649,717

[22] PCT Filed: Sep. 27, 1995

[86] PCT No.: PCT/JP95/01953

§ 371 Date: Aug. 16, 1996

§ 102(e) Date: Aug. 16, 1996

[87] PCT Pub. No.: WO96/10726

PCT Pub. Date: Apr. 11, 1996

[30] Foreign Application Priority Data

Sep. 30, 1995 [JP] Japan ............................... 6-261672

[51] Int. Cl.⁶ ....................................... G01B 11/14
[52] U.S. Cl. ..................... 356/376; 356/375; 250/559.29
[58] Field of Search ............................. 356/375, 376, 356/243, 373, 399; 250/559.29, 559.3, 559.31, 559.37

[56] References Cited

U.S. PATENT DOCUMENTS

| | | | |
|---|---|---|---|
| 4,660,970 | 4/1987 | Ferrano | 356/376 |
| 4,911,550 | 3/1990 | Hisakuni | 356/376 |
| 5,416,590 | 5/1995 | Stover et al. | 356/375 |
| 5,532,499 | 7/1996 | Cheng | 356/376 |

FOREIGN PATENT DOCUMENTS

| | | | |
|---|---|---|---|
| 62-21009 | 1/1987 | Japan | G01B 11/14 |
| 1-295109 | 11/1989 | Japan | G01C 3/06 |
| 2-272308 | 11/1990 | Japan | G01B 11/24 |
| 4-84707 | 3/1992 | Japan | G01B 11/24 |

*Primary Examiner*—Hoa Q. Pham
*Attorney, Agent, or Firm*—Limbach & Limbach LLP

[57] ABSTRACT

A method of measuring precisely and highly accurately the distance between the surface at a predetermined position of a mold and a laser measuring instrument. The distance between the surface of a mold frame and the laser measuring instrument is measured by directing a laser beam to four positions on the surface of the mold frame, the positions on the surface of the mold frame are expressed by x-y coordinates while the distance between the surface of the mold frame and the laser measuring instrument is expressed by a z coordinate. An equation $\Delta z = ax + by + c$ for correcting the measurement value of the distance between the surface of the mold frame and laser measuring instrument is determined by using the four measurement values and the maximum or minimum value of the these measurement values as the reference, and the distance between the position on the mold and the laser measuring instrument is measured. The correction values of the measurement positions are calculated from the equation $\Delta z = ax + by + c$ and the coordinate values of the x-y coordinates of the measurement positions, and thse corrected values are added to the measurement values of the distance between the surface of the measurement portions of the mold and the laser measuring instrument.

1 Claim, 2 Drawing Sheets

5,715,062

METHOD OF MEASURING SIZES OF MOLD AND MOLD-ASSOCIATED COMPONENTS BY LASER MEASURING INSTRUMENT

TECHNICAL FIELD

This invention relates to a method of measuring sizes of a mold and mold-associated components by a laser measuring instrument, and, in particular, to a method of measuring a distance between a laser measuring instrument and the surface of each of a molding flask, mold, and mold-associated components by a laser measuring instrument wherein the instrument is disposed above the flask etc. such that it can move alongside the surface of the flask etc., and wherein it emits a laser beam to the surface and observes the laser spot on it to measure the distance between the surface and the instrument.

BACKGROUND ART

Recently, determining the quality of the cavity of a mold by measuring the dimensions of the cavity has been proposed to enhance the quality by eliminating staggers and casting fins of castings. Further, a method to measure the distance by emitting a laser beam and observing the laser spot was conceived as a method to measure the dimensions of the cavity.

However, when the dimensions of the cavity of a mold are measured by a laser measuring instrument, the levelness of the place on which a mold flask etc. is put is sometimes bad in comparison with the preciseness of measurements by the instrument. For example, the levelness of a conveying route may be bad due to an old flask or conveyor, or an unnecessary substance that enters the space between the flask and conveyor. This is disadvantageous as it causes a large error between the actual distance and the measured distance.

The present invention is made to eliminate this disadvantage. It aims to provide a method for precisely and accurately measuring the distance between a surface of a molding flask etc. and a laser measuring instrument.

DISCLOSURE OF INVENTION

To this end, the present invention is a method for measuring by a laser measuring instrument a distance between the laser measuring instrument and a surface of a flask, mold, or mold-associated component wherein the laser measuring instrument that emits a laser beam onto a surface of the flask etc. and that observes the laser spot on the surface is disposed above the flask etc. such that the instrument moves alongside the surface of the flask etc. The method includes a first step of emitting laser beams onto four points on the surface by the laser measuring instrument and measuring the distance between the instrument and each point, a second step of expressing points on the surface as x-y coordinates and expressing distances between the surface and the laser measuring instrument as a z coordinate, and obtaining an equation $\Delta z = a\,x + b\,y + c$ to represent compensation values that compensate for the measurements of the distances between the surface and the laser measuring instrument based on the four measurements at the four points and one of the maximum and minimum values of the four measurements, a third step of measuring distances between target points on the surface of the mold or the mold-associated component and the laser measuring instrument, a fourth step of calculating compensation values for the target points from the equation $\Delta z = a\,x + b\,y + c$ and the values of the x-y coordinates on the target points, and a fifth step of adding the compensation values to the measurements of the distances between the target points and the laser measuring instrument.

Herein a mold means one that has a groove etc. formed in the cavity or mold for showing its position, and a mold-associated component means a molding flask, a bushing of a flask for indexing it (centering of a bushing), etc.

BEST MODE FOR CARRYING OUT THE INVENTION

Figure 1:
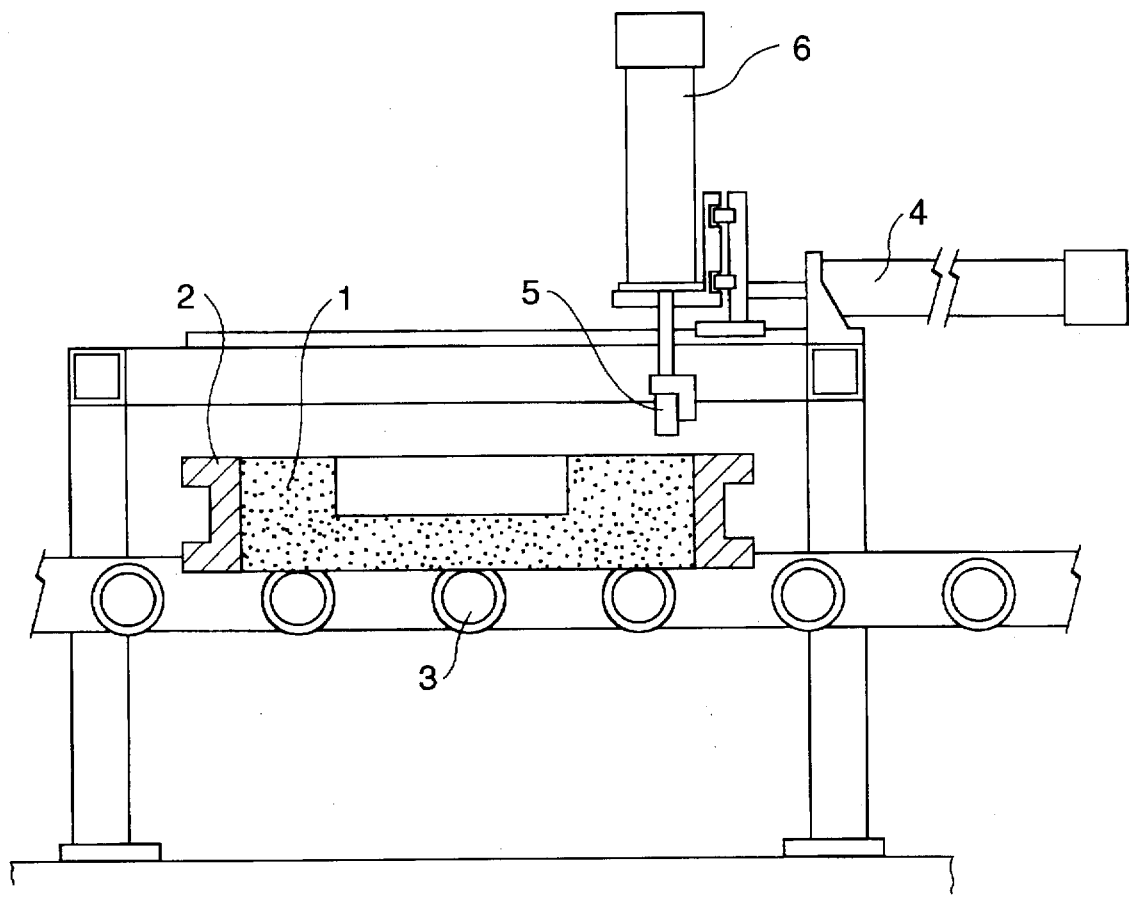
FIG. 1 is a schematic front view of the embodiment of a device that carries out the method of the present invention.
Figure 2:
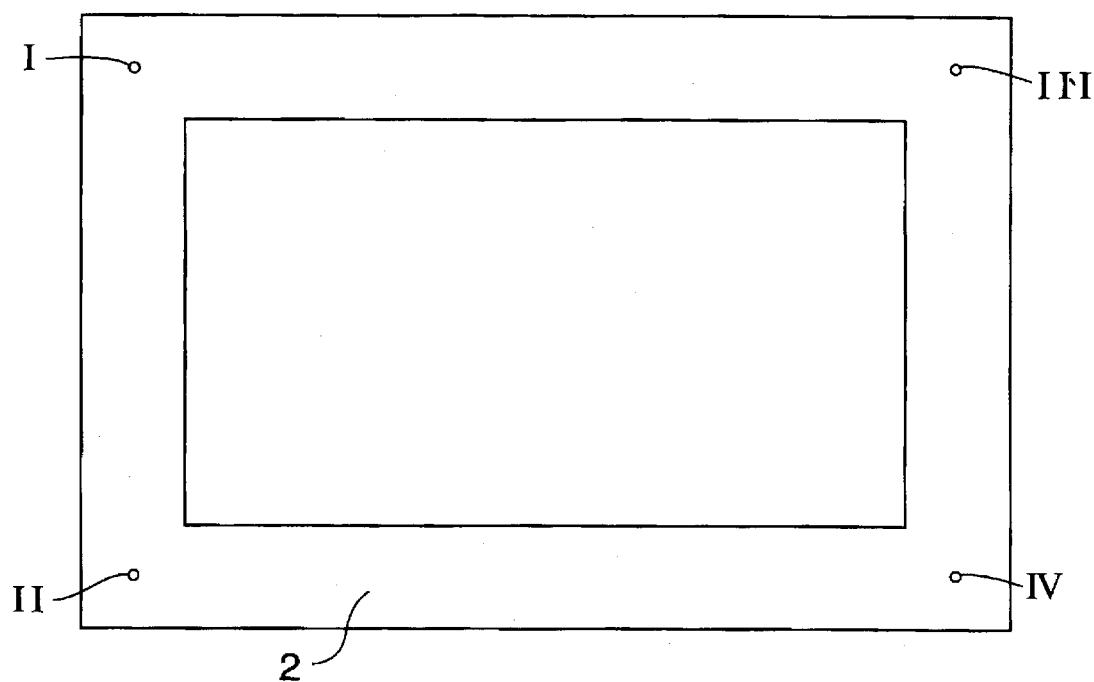
FIG. 2 is an enlarged plan view of a main part (molding flask) of the device in FIG. 1.
Figure 3:
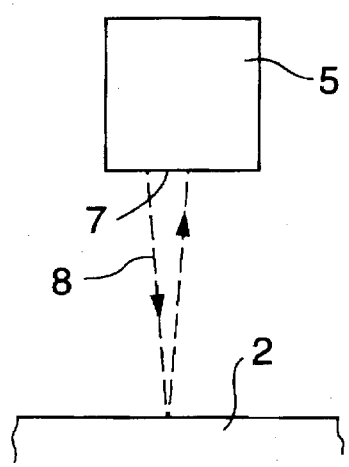
FIG. 3 is an enlarged front view of a main part (laser measuring instrument) of the device in FIG. 1.

The embodiment of the present invention will now be explained in detail by reference to FIGS. 1, 2, and 3. As in FIG. 1, which is a front view, a flask 2 holding a mold 1 therein is intermittently conveyed to the left side by a roller conveyor 3 and is stopped at a predetermined position. Then, a laser measuring instrument 5 is sequentially moved by two electric cylinders (in FIG. 1 one is omitted and the other is designated by the number 4) to four points I–IV on the upper surface of the flask 2, which surface is shown in FIG. 2, which is a plan view of the flask. The laser measuring instrument 5 is also moved vertically to a predetermined level by an electric cylinder 6. During the movement of the laser measuring instrument 5, a laser beam 8 is emitted from its laser emitting portion 7 onto the surface of the flask 2 (see FIG. 3), and a laser spot or photo mark on the mold 1 is observed by a photo receptive portion of the laser measuring instrument 5 to measure the distance between each of the four points I–IV and the laser measuring instrument.

The levelness of the flask 2 itself as required is made to be such by a machine etc. during the machining of the surface of the flask.

Then, as the locations of the points I–IV on the surface of the flask 2 are expressed as x-y coordinates, and the distance between the surface and the laser measuring instrument 5 is expressed as a z coordinate, an equation to calculate a compensation value $\Delta z$ that compensates for the measurements of the distances between the four points I–IV on the surface of the flask 2 etc. and the laser measuring instrument, i.e., $\Delta z = a\,x + b\,y + c$, is obtained based on both the measurements of the four points I–IV by the instrument and either the maximum or minimum value of the four measurements.

The distance that the laser measuring instrument 5 moves in the horizontal plane is measured by rotary encoders provided in the cylinders, and the positions of the four points I–IV are expressed respectively as I$(x_1, y_1)$, II $(x_2, y_2)$, III $(x_3, y_3)$, and IV $(x_4, y_4)$, and the distances between the surface of the flask 2 at the positions I–IV and the laser measuring instrument are respectively expressed as $z_1$, $z_2$, $z_3$, and $z_4$.

To obtain the equation, $\Delta z = a\,x + b\,y + c$, first, the maximum or minimum value of the distances $z_1$, $z_2$, $z_3$, and $z_4$ is obtained. For example, if the maximum value is $z_4$, the compensation value at point IV $(x_4, y_4)$ is obtained as $\Delta z = a(x - x_4) + b(y - y_4) + c$. The coefficients a, b, and c are obtained by solving the equations below.

$$z_1 - z_4 = a\,(x_1 - x_4) + b(y_1 - y_4) + c$$

$$z_2 - z_4 = a(x_2 - x_4) + b(y_2 - y_4) + c$$

$$z_3 - z_4 = a(x_3 - x_4) + b(y_3 - y_4) + c$$

Then, distances between points on the mold or mold-associated components to be measured (target points) and the laser measuring instrument 5 are measured by the instrument 5, and the position of each measured point is expressed as $x_t$, $y_t$ and $z_t$ on the x-, y-, and z-coordinates and are then input in the equation, $\Delta z = a\,x + b\,y + c$, where the coefficients, a, b, and c, are known as above, to calculate the compensation values $\Delta z_t$ for each point. Each compensation value $\Delta z_t$ is respectively added to the each measured value $z_t$. Thus accurate distances between the upper surface of a mold or a mold-associated component at given points thereof and a laser measuring instrument 5 can be precisely obtained.

As is seen from the foregoing description, since the method of the present invention includes a first step of emitting laser beams onto four points on the surface by the laser measuring instrument and measuring the distance between the instrument and each point, a second step of expressing points on the surface as x-y coordinates and expressing the distances between points on the surface and the laser measuring instrument as a z coordinate, and obtaining an equation $\Delta z = a\,x + b\,y + c$ to represent compensation values that compensate for the measurements of the distances between the points on the surface and the laser measuring instrument based on the four measurements at the four points and either the maximum or minimum value of the four measurements, a third step of measuring distances between target points on the surface of the mold or the mold-associated component and the laser measuring instrument, a fourth step of calculating compensation values on the target points from the equations $\Delta z = a\,x + b\,y + c$ and the values of x-y coordinates on the target points, and a fifth step of adding the compensation values to the measurements of the distances between the target points and the laser measuring instrument, the measurements of their distances are obtained wherein the levelness of the flask is considered. Thus highly precise dimensions of a mold etc. are obtained.

I claim:

1. A method for measuring by a laser measuring instrument a distance between a laser measuring instrument and a surface of a flask, mold, or mold-associated component wherein the laser measuring instrument that emits a laser beam onto a surface of the flask, mold, or mold-associated component and observes a laser spot on the surface is disposed above the flask, mold, or mold-associated component such that the instrument moves alongside the surface of the flask, mold, or mold-associated component, comprising:

a first step of emitting laser beams onto four points on said surface of said flask by said laser measuring instrument and measuring the distance between the instrument and each point;

a second step of expressing a point on said surface of said flask as x-y coordinates and expressing the distance between said surface and said laser measuring instrument as a z coordinate, and obtaining an equation $\Delta z = ax + by + c$ to represent a compensation value that compensates for the measurement of said distance between said surface and said laser measuring instrument based on said four measurements of said four points and one of the maximum value and minimum value of said four measurements;

a third step of measuring the distance between a target point on said surface of said mold or said mold-associated component and said laser measuring instrument;

a fourth step of calculating a compensation value for said target point from said equation $\Delta z = ax + by + c$ and said values of the x-y coordinates of said target point; and a fifth step of adding said compensation value to said measurement of said distance between said target point and said laser measuring instrument so as to generate a measurement between said target point and said laser measuring instrument which adjusts for the levelness of said flask.

* * * * *